Nov. 25, 1969     J. M. EITEL ET AL     3,480,109

LIFTING EQUIPMENT

Filed Jan. 15, 1968     6 Sheets-Sheet 1

Fig. 1

INVENTORS
Jay M. Eitel
BY   Bertram J. Leigh

Attorneys

INVENTORS
Jay M. Eitel
BY Bertram J. Leigh
Attorneys

United States Patent Office 3,480,109
Patented Nov. 25, 1969

3,480,109
LIFTING EQUIPMENT
Jay M. Eitel, Atherton, and Bertram J. Leigh, Redwood City, Calif., assignors to Telsta Corporation, San Carlos, Calif., a corporation of California
Continuation-in-part of application Ser. No. 572,306, Aug. 15, 1966. This application Jan. 15, 1968, Ser. No. 697,900
Int. Cl. E04g 1/18; B66c 23/62
U.S. Cl. 182—148          18 Claims

ABSTRACT OF THE DISCLOSURE

Lifting equipment having an outer boom section and an inner boom section with self-supporting carrier track means having one end secured to the outer boom section and having the other end secured to the inner boom section for carrying cables by which control means which moves with one of the boom sections can be utilized for controlling operation of motive means which is utilized for controlling movement of the sections with respect to each other.

Cross-reference to related applications

This application is a continuation-in-part of application Ser. No. 572,306, filed Aug. 15, 1966 and now abandoned.

Background of the invention

In patent application Ser. No. 521,193, filed Jan. 17, 1966, and now abandoned, there is disclosed a new and improved lifting equipment. However, in this lifting equipment, the telescoping boom structure has not been simplified to the extent desired, nor is the telescoping boom structure particularly adaptable for use with an insulated telescoping boom section. There is, therefore, a need for a new and improved lifting equipment overcoming the above named disadvantages.

Summary of the invention and objects

The lifting equipment comprises a platform with a support structure rotatably mounted upon the platform for rotation about a substantially vertical axis. A boom structure having an outer boom section and an inner boom section is provided in which the outer boom section is pivotally mounted upon the support structure for pivotal movement about a substantially horizontal axis. A workman's platform is carried by the outer end of the telescoping boom section and control means disposed within reach of the operator in the workman's basket is provided. Motive means is provided for causing relative movement between the inner boom section and the outer boom section. Self-supporting carrier track means which has one end connected to the outer boom section and the other end secured to the inner boom section is provided which carries cables connected to the control means and to the motive means.

In general, it is an object of the present invention to provide a lifting equipment which has a simplified and improved telescoping boom structure.

Another object of the invention is to provide a lifting equipment having a telescoping boom structure which can utilize either an insulated or metal telescoping boom.

Another object of the invention is to provide a lifting equipment having a telescoping boom structure of the above character in which the motive means for extending and retracting the telescoping boom section is carried by the telescoping boom section.

Another object of the invention is to provide a lifting equipment having a telescoping boom structure of the type in which the speed reducing assembly which serves as a part of the motive means is incorporated in the telescoping boom section and is carried thereby.

Another object of the invention is to provide a lifting equipment of the above character in which the motive means can include either an electric motor or a fluid motor for driving the speed reducing assembly.

Another object of the invention is to provide a lifting equipment of the above character which has substantially reduced power requirements.

Another object of the invention is to provide a lifting equipment with a telescoping boom structure of the above character which has particularly novel means for carrying the cables which are utilized for controlling the boom structure and supplying power to the telescoping boom section.

Another object of the invention is to provide a lifting equipment having a telescoping boom structure of the above character in which the inner or telescoping boom section can be readily removed.

Another object of the invention is to provide a lifting equipment having a telescoping boom structure of the above character in which the telescoping boom section is substantially circular in cross-section.

Another object of the invention is to provide a lifting equipment having a telescoping boom structure of the above character in which the telescoping boom section is mounted as a cantilever on the outer boom section.

Additional objects and features of the invention will appear from the following description in which the preferred embodiment is set forth in detail in conjunction with the accompanying drawings.

Description of the preferred embodiments

The lifting equipment shown in FIGURES 1-6 consists of a self-propelled vehicle 11 having front and rear wheels 12 and 13 rotatably mounted upon the chassis or framework (not shown) which serves as a platform. Suitable motive means (not shown) is provided for supplying power to the rear wheels 13 of the vehicle. A van-type body 14 is mounted on the chassis of the self-propelled vehicle and is generally of the type disclosed in copending application Ser. No. 521,193, filed Jan. 17, 1966.

Figure 1:
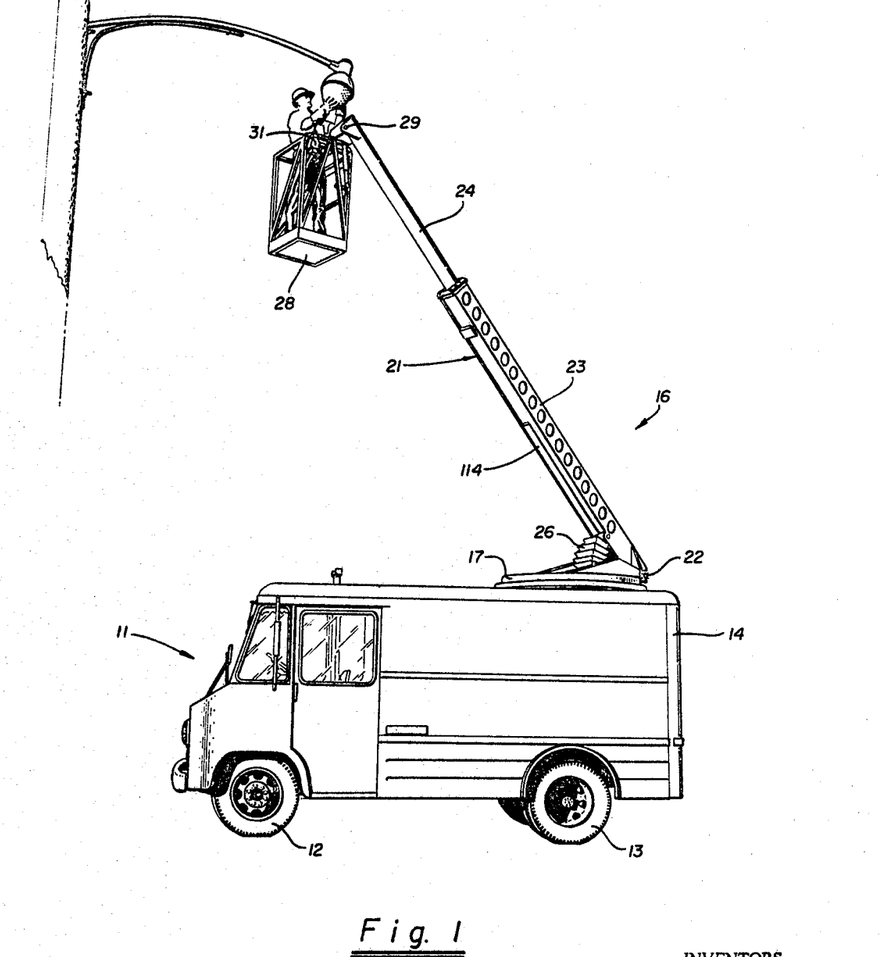
FIGURE 1 is a perspective view of a lifting equipment incorporating the present invention.

A lifting apparatus 16 is mounted on the self-propelled vehicle 11 and consists of a support structure 17 of the type described in copending application Ser. No. 521,193, filed Jan. 17, 1966. As described in said copending application, means is provided for mounting the support structure 17 on the chassis of the vehicle 11 to permit rotational movement about a substantially vertical axis. Means (not shown) of the type described in said copending application is provided for causing relative rotational movement between the van-type body 14 and the support structure 17.

A boom structure 21 of the telescoping type is pivotally mounted for movement about a horizontal axis formed by pivot pins 22. The pivot pins 22 form a pivotal connection between the rear extremity of an outer section 23 of the boom structure and the support structure 17. The boom structure 21 also includes an inner or telescoping section 24. Means is provided for raising and lowering the outer or free end of the boom structure 21 or, in other words, for swinging the boom structure 21 about the horizontal axis formed by the pivot pins 22 and consists of an actuator assembly 26. The actuator assembly 26 can be of any of the various types disclosed in copending application Ser. No. 521,193, filed Jan. 17, 1966, and, therefore, will not be described in detail. For example, it can consist of a hydraulic cylinder having a piston rod 27 which is pivotally connected to the outer boom section 23 for raising and lowering the boom structure 21.

The workman's or operator's platform or basket 28 is pivotally secured to the outer end of the telescoping boom section 24 by a pin 29. The pivotal mounting permits the platform or basket 28 to assume a level condition as the boom structure is raised and lowered about the horizontal axis. Control means which includes a control mechanism 31 is provided for controlling the operation of the boom structure 21 and is mounted on the workman's basket or platform 28 as shown in the drawings to permit the workmen in the basket to control the operation of the boom structure from the basket. The control mechanism can be of the type described in Patent No. 3,136,385.

Particularly novel means is provided for causing extension or retraction of the inner or telescoping section 24 relative to the outer section 23. As hereinafter described, the motive means for advancing and retracting the telescoping or travelling boom section 24 is mounted in the travelling or telescoping boom section 24 and travels with it. As can be seen particularly from FIGURES 2–4, the outer boom section is substantially rectangular in cross-section. The travelling or telesoping section 24 is provided with a rear portion 24a and a forward portion 24b. The rear portion 24a is generally in the form of a rectangular box-like framework or gear box 36, whereas the forward portion 24b is tubular as hereinafter described.

The framework or gear box 36 is generally rectangular as hereinbefore described and is of such a size so that it can readily fit within the outer boom section 23. Motive means in the form of an electric motor 37 is mounted in the framework 36. The motor 37 is provided with a rotating armature 38 and field coils 39. The armature 38 is mounted on a shaft 41. Although an electric motor has been shown as the motive means, it should be appreciated that other types of motors as, for example, a hydraulic motor, can be readily substituted for the motor 37.

The shaft 41 is rotatably mounted in the framework 36 by a pair of ball bearing assemblies 43 carried by cylindrical extensions 44 formed as a part of the framework 36. The motor 37 drives a speed reducing assembly in the form of a spur gear train which consists of a drive pinion 46 that is secured to the shaft 41. The pinion 46 drives a secondary spur gear 47 mounted upon a shaft 48 rotatably mounted in ball bearing assemblies 49 carried by the framework 36. A secondary drive pinion 51 is mounted on the shaft 48 and drives an output spur gear 52 carried by a shaft 53 rotatably mounted in ball bearing assemblies 54 carried by the framework 36. It is readily apparent that, if desired, other speed reducing means as, for example, a worm gear type reducing means can be utilized in place of the spur gear train.

Figure 2A:
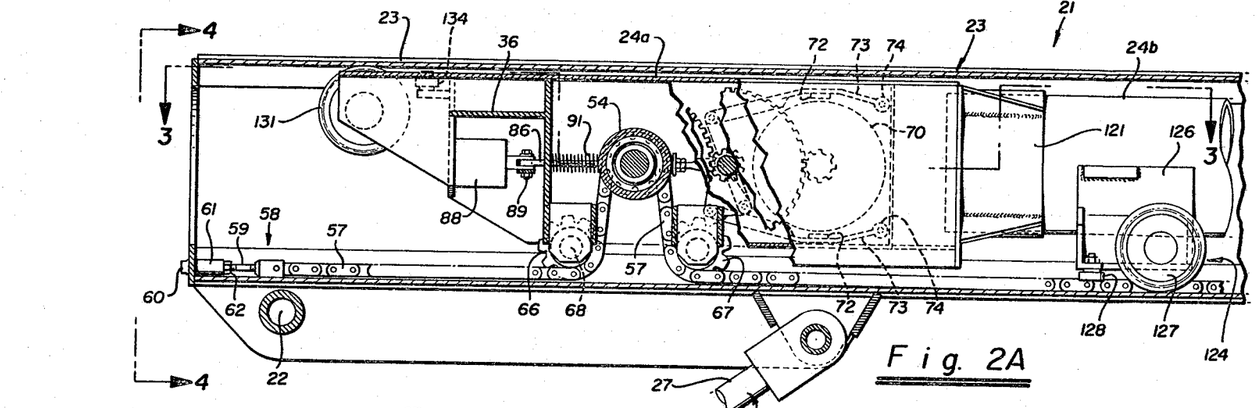
FIGURES 2A and 2B show a side elevational view of the telescoping boom structure utilized in the lifting equipment shown in FIGURE 1 with certain parts broken away and with certain other parts shown in cross-section.
Figure 2B:
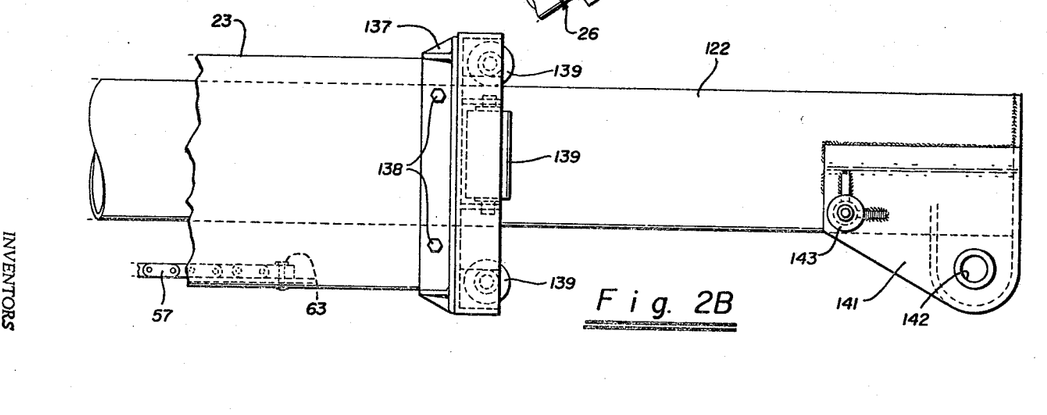
Figures 3, 4:
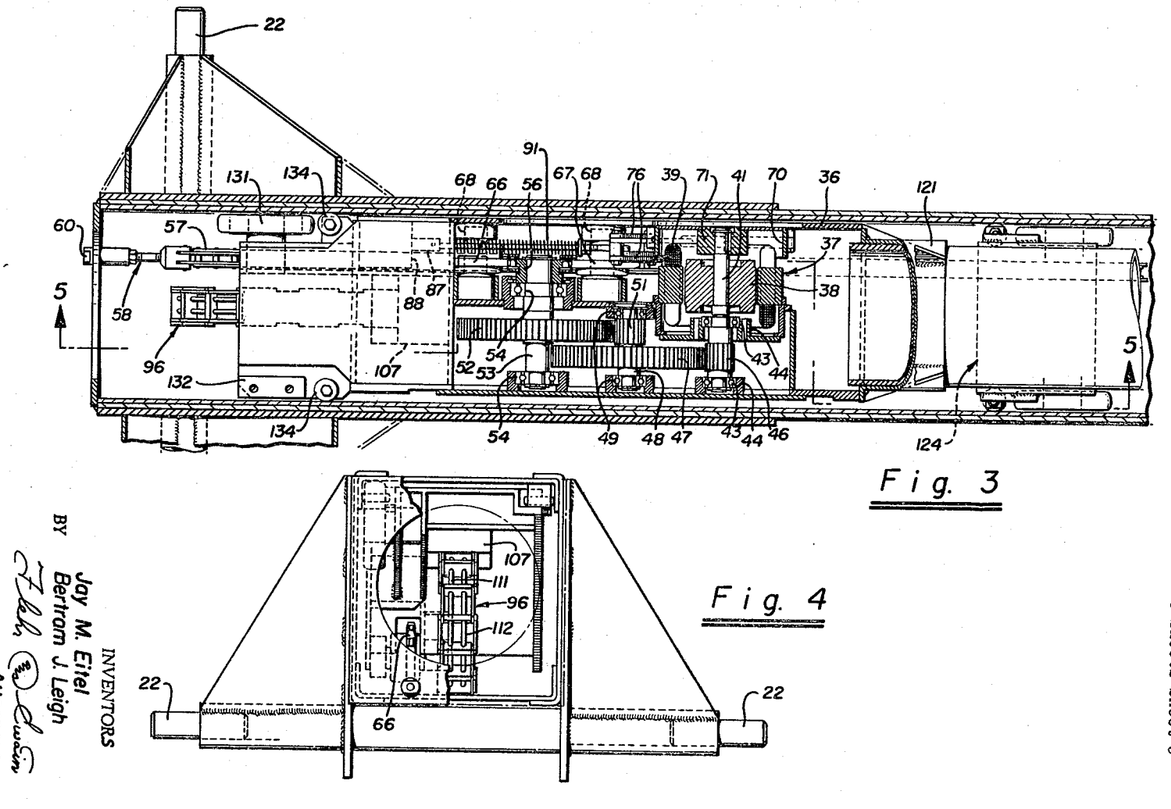
FIGURE 3 is a cross-sectional view taken along the line 3—3 of FIGURE 2A.
FIGURE 4 is an end elevational view looking along the line 4—4 of FIGURE 2A.

A drive sprocket 56 is affixed to the shaft 53. The drive sprocket 56 engages a chain 57. The chain 57 is secured to the outer boom 23, and as shown in FIGURE 2A, has one end secured to adjustable tensioning means 58 in the form of a threaded rod 59 which is fastened to the rear of the boom 23 by a nut 60. A spacer sleeve 61 is mounted on the rod 59 and is locked in place by a jam nut 62. The other end of the chain 57 is secured to the forward portion of the outer boom section 23 as shown in FIGURE 2B by suitable means such as a bolt 63. As can be seen particularly from FIGURE 2A, the chain 57 follows a rather serpentine path in that it travels over the drive sprocket 56 and travels under a pair of idler sprockets 66 and 67 disposed on opposite sides of the drive sprocket 56 as viewed in FIGURE 2A. The idler sprockets 66 and 67 are mounted upon shafts 68 which are rotatably mounted in the framework 36. As hereinafter described, it can be seen that when the motor 37 is operated, the drive sprocket 56 will cause the inner or telescoping section 24 to travel on the chain 57 carried by the outer boom section 23.

Means is provided for arresting the travel of the inner or telescoping section 24 as soon as the motor 37 is deactivated or deenergized and consists of brake means in the form of a brake drum 70 having a hub 71 affixed to the shaft 41. The brake drum 70 is adapted to be engaged by braking shoes or biscuits 72 (see FIGURE 2A). The biscuits 72 are carried by arms 73 which are pivotally mounted on the framework 36 by pins 74. One end of one of the arms 73 is pivotally connected to a link 76 by pin 77, and the other end of the link 76 is pivotally connected by a pin 78 to one corner of a triangularly-shaped plate 79. The other arm 73 is pivotally connected to another corner of the triangularly-shaped plate by pin 81. The other corner of the plate 79 is pivotally connected to a tab or extension 82 by a pin 83. The tab or extension 82 is threaded into a nut 84 mounted on a connecting rod 86. The connecting rod 86 is pivotally connected to the plunger 87 of a solenoid 88 by a suitable means such as a bolt 89. The solenoid 88 is secured to the framework 36. Means is provided for yieldably urging the upper end of the triangular plate 79 to the right as viewed in FIGURE 5 to normally maintain the brake biscuits 72 out of engagement with the brake drum 70 and consists of a spring 91 mounted on the rod 86 and having one end engaging the nut 84 and having the other end engaging the framework 36. Means is also provided for preventing the arms 73 from opening too far with respect to the brake drum 70 and consists of ears 92 which are affixed to the framework 36 and which carry cap screws 93 threadedly mounted therein and adapted to be engaged by the arms 73.

Means is provided for supplying power to the motor 37 and to the solenoid 88 as well as supplying cabling to the control means 31 mounted on the workman's platform or basket 28 and consists of a self-supporting carrier track 96 of the type manufactured and sold by the Gleason Reel Division of Maysteel Products Corp. of Mayville, Wis. Such a self-supporting track consists of a plurality of links 97 which are pivotally interconnected at pivot points by laterally extending carriers 99. The carriers 99 are provided with threaded studs 101 that extend through the links and are secured to the links by nuts 102. Each of the carriers 99 is provided with a pair of spaced holes which are axially aligned in direction parallel to and extending longitudinally of the links 97. One end of the supporting track is provided with a stationary mounting bracket 104 which is secured to the bottom side of the outer boom section 23 as viewed in FIGURE 6 by screws 105, whereas the other end of the self-supporting track is provided with a movable mounting bracket 106. The mounting bracket 106 is removably connected to a junction box 107 by bolts 108 to cause the track 96 to form a self-supporting upper run which follows the telescoping section 24 and is positioned above the bottom of the outer section 23.

A pair of cables 111 and 112 are carried by the self-supporting track 96 and are disposed in the holes 103 provided in the carriers 99 and extend longitudinally of the self-supporting track. As can be seen from FIGURE 5, the cables 111 and 112 extend out of the stationary mounting bracket 104 through the opening 113 provided in the outer boom section 23 and rearwardly beneath the outer boom section 23 in a channel 114 fastened beneath the outer boom section 23. The cables then extend downwardly into the van-type body 14 where they are connected to a control panel (not shown) and to a suitable power supply such as a gasoline motor driven generator (not shown). The other ends of the cables 111 and 112 are connected to male connectors (not shown) within the junction box 107 which are fitted into female receptacles (not shown) also within the junction box 107. The female receptacles are connected to a pair of cables 116 and 117, one of which is connected to the motor 37 and by an additional cable 118 to the solenoid 88, and the other of which is connected to the control mechanism 31 provided in the workman's basket 28.

Figures 5, 6:
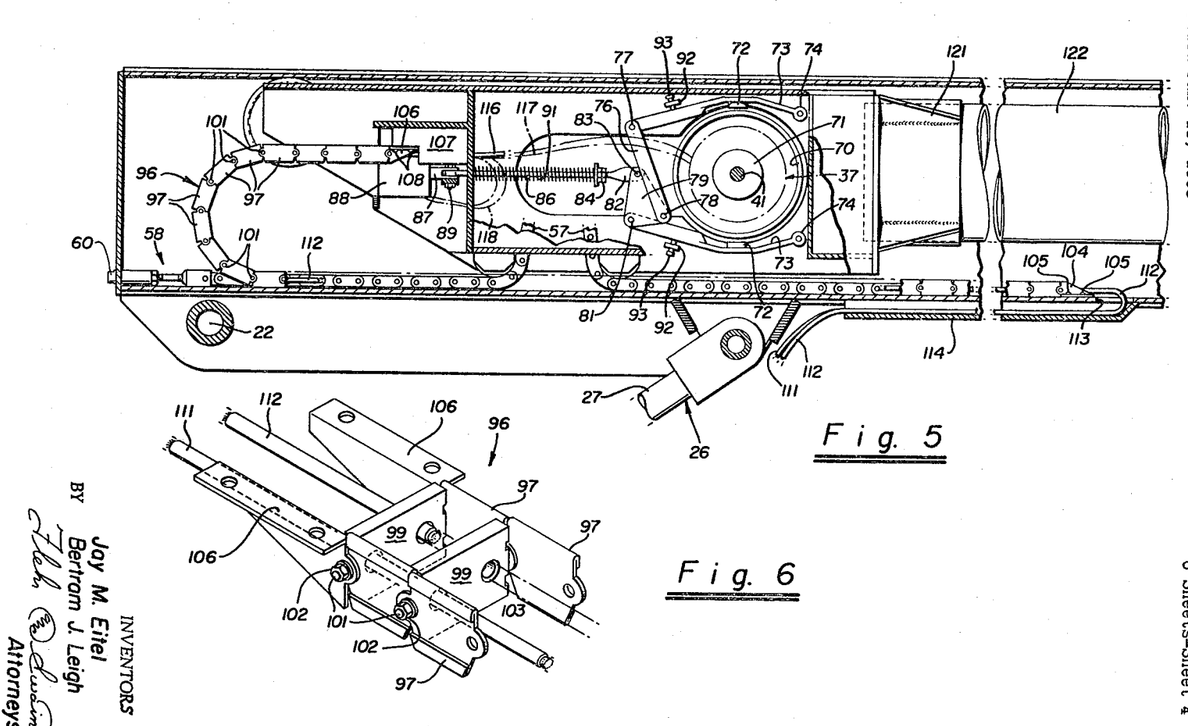
FIGURE 5 is a view similar to FIGURE 2A but showing different portions of the boom structure.
FIGURE 6 is an isometric view of the self-supporting track utilized for carrying the power and control cables for the boom structure.
Figure 7:
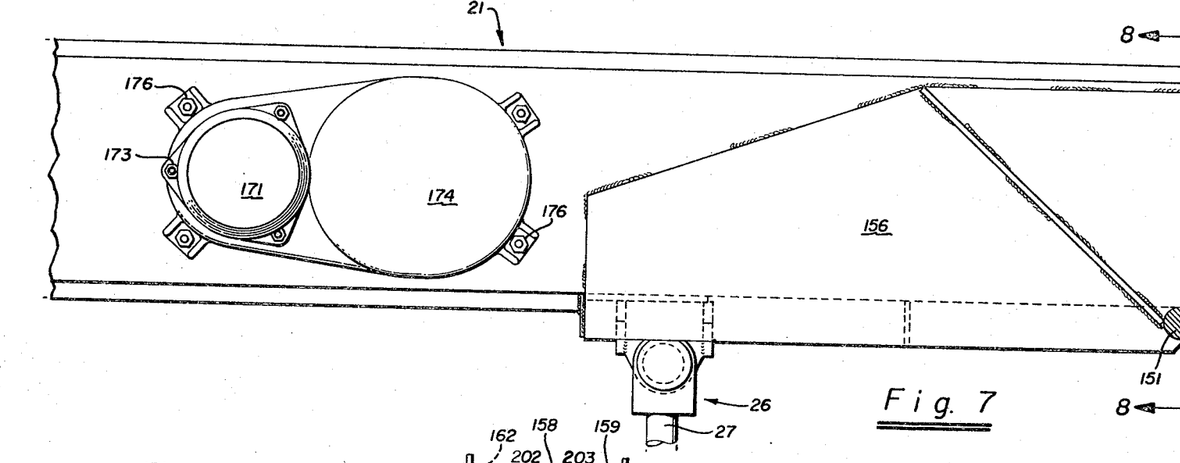
FIGURE 7 is a side elevational view of a portion of a lifting equipment and in particular showing a portion of the boom structure.
Figure 8:
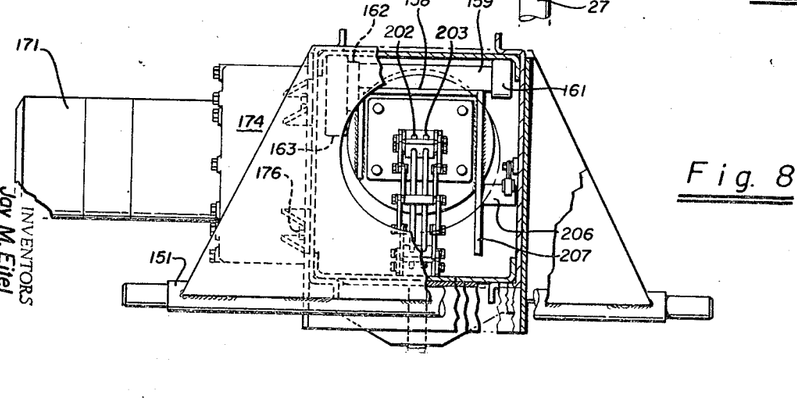
FIGURE 8 is a view looking along the line 8—8 of FIGURE 7 with certain parts broken away.
Figure 9:
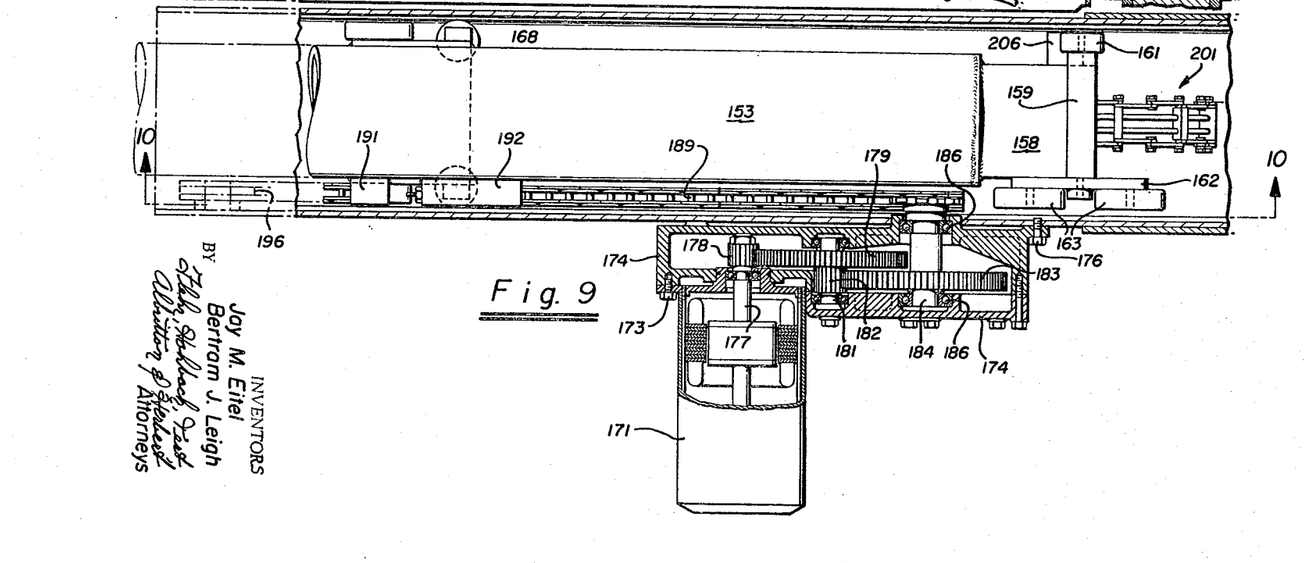
FIGURE 9 is a top plan view of the portion of the boom section shown in FIGURE 7 with certain parts in cross-section.
Figure 10:
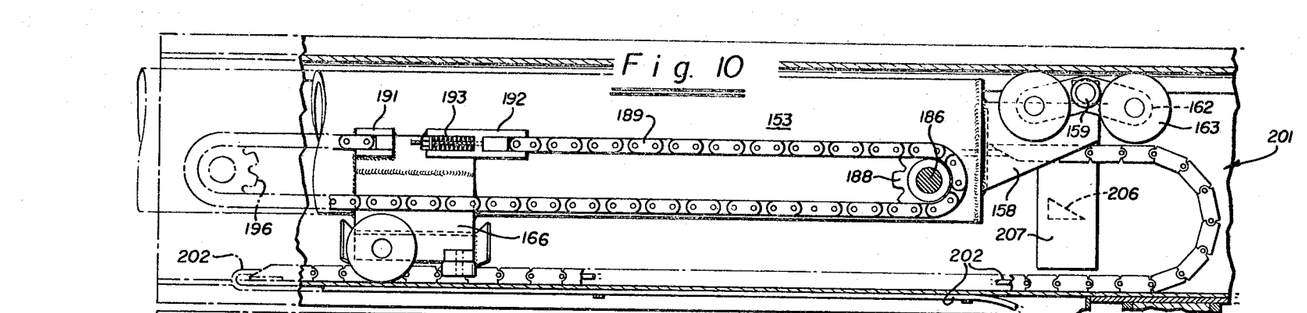
FIGURE 10 is a cross-sectional view taken along the line 10—10 of FIGURE 9.

As can be seen from FIGURE 5, the rear section 24a of the telescoping boom section 24 is provided with a reinforced forwardly extending collar 121 in which there is mounted a tubular member 122 which forms a part of the forward portion 22b. The tubular member 122 can be formed of any suitable material. For example, if great rigidity and strength are required, the tubular member 122 can be formed of steel. However, if it is desired to provide an insulated boom structure, the entire member 122 can be formed of a suitable insulating material such as fiberglass. In order to reduce the expense of such a tubular member, the tubular member can be circular in cross-section as shown in the drawing. Also, if desired, only a portion of the length of the tubular member 122 can be formed of the insulating material because normally it would only take a relatively short length of insulating material to provide insulation against the conventional voltages which would be encountered by such equipment.

Means is provided as a part of the inner or telescoping section 24 to facilitate its movement within the outer boom section 23 and comprises a dolly assembly 124. The dolly assembly 124 consists of a saddle 126 which is secured to the lower side of the tubular member 122 immediately ahead of the collar 121. If the tubular member 122 is formed of steel, the saddle 126 can be secured to the tubular member 122 by suitable means such as welding. If the tubular member 122 is formed of insulating material such as fiberglass, the saddle 126 can also be formed of fiberglass or steel and secured to the tubular member 122 by additional fiberglass and resins in a manner which is well known to those skilled in the art. Large rollers 127 are mounted on opposite sides of the saddle 126 and are adapted to travel on the bottom side of the outer boom section 23 as shown particularly in FIGURE 2A. Relatively small side guiding rollers 128 are also rotatably mounted upon the saddle 126 to the rear of the rollers 128. Another large roller 131 is mounted on the upper rear portion on one side of the inner or telescoping boom section and is adapted to engage the upper side of the outer boom section 23. The other side of the inner boom section 24 is provided with a shoe 132 of suitable material such as Fabreeka which normally is out of engagement with the upper side of the outer boom section 24, but if such engagement does occur, it reduces the friction which is encountered between the inner and outer boom sections. It is found that only the one roller 131 is necessary on the rear portion 124a because the workman's platform or basket 28 places torsional forces on the boom structure which normally causes all the bending moment to be carried by the roller 131 and normally maintains the shoe 132 out of engagement with the outer boom section 23. However, if desired, another roller 131 can be used in place of the shoe 132 to provide a telescoping boom section in which the basket 28 can be mounted on either side of the boom 24. A plurality of small side guiding rollers 134 are mounted on the portion 24a of the boom section 24 and are in general alignment with the small rollers 128 of the dolly assembly 124.

A removable roller assembly 136 is provided on the outer end of the outer boom section 23 and consists of a rectangular frame 137 which is secured to the outer portion of the outer boom section 23 by suitable means such as bolts 138. A plurality of rollers 139 formed of suitable resilient material such as neoprene are carried by the frame 137. As can be seen, two of the rollers are mounted on the top and bottom of the frame, whereas the other two rollers are mounted on the two sides of the frame.

An end fitting 141 is mounted on the outer end of the tubular member 122 and is provided with a hole 142 for the pin 29 for pivotally mounting the workman's platform or basket 28. It is also provided with a fitting 143 which is adapted to receive a shock absorber (not shown) for stabilizing the workman's platform or basket.

Operation and use of the lifting equipment may now be briefly described as follows. In general, the operation of the lifting equipment is very similar to that described in application Ser. No. 521,193, filed Jan. 17, 1966. If the lifting equipment is to be utilized for a conventional operation as, for example, of a changing of street lights as shown in FIGURE 1, the operator of the vehicle advances the vehicle to the desired location and then steps from the operator's driving station in the vehicle directly into the workman's basket or platform 28 which is normally stored alongside the driving station and enters the same without dismounting the vehicle. The operator then engages the control mechanism 31 to operate the lifting apparatus to position the basket 28 in the desired location adjacent the street light to carry out the desired operation, after which the workman can again lower himself to a position alongside the driving station. The workman can then dismount from the basket and enter the driving station to drive to the next location.

In operating the control mechanism 31, the operator can rotate the boom structure 21 about a vertical axis and raise and lower the same about the horizontal axis formed by the pivot pins 22 and to extend and retract the same.

Upon operation of the control mechanism 31 to either extend or retract the inner or telescoping boom section 24, the motor 37 is energized and at the same time the solenoid 88 is energized. Energization of the solenoid 88 causes the biscuits 72 to be shifted away from the brake drum 70 to permit the motor to rotate the shaft 41 which, depending upon the direction of rotation, causes the spur gear train to drive the drive sprocket 56 which, in turn, causes the telescoping boom section 24 to advance or retract as the sprocket 56 travels on the chain 57. Limit switches (not shown) are mounted on the outer boom section to limit the innermost and outermost travel of the telescoping boom section 24. From the arrangement shown in FIGURE 2A, it can be seen that if the sprocket 56 is rotated, the track 57 is first picked up by the sprocket 56 and then laid down on the bottom of the outer section 23. With this arrangement, it can be seen that only a very short length of chain is required, i.e., less than the length of the outer boom section, for advancing and retracting the telescoping boom section. Most of the chain 57 is held in relatively close proximity to the bottom wall of the outer boom section and, therefore, cannot readily flop about within the boom section as the vehicle travels down the road, thus reducing wear on the chain.

As the telescoping boom section 23 is extended and retracted, the cabling which is required for operating the control mechanism 31, the electric motor 37 and the solenoid 88 is supplied by the cables 111 and 112 carried by the self-supporting track 96. Again, it will be noted that the track 96 is relatively short in length and need have a length which is only one-half of the maximum distance through which the telescoping boom section is extendible and retractible plus the distance required for the bend. As can be seen particularly from FIGURES 5 and 6, the track 96 is self-supporting and provides adequate support for the cables 111 and 112 so that at no time can they become entangled in the other mechanisms. Also, with such an arrangement, substantially all space within the outer book section is usable.

The self-supporting track 96 is made so that it can only flex in one direction. It has the advantage in that a 180° bend can be made as shown in FIGURE 5. With the arrangement shown, it has the advantage when the telescoping boom section 24 is completely retracted, almost all of the self-supporting track 96 has been deposited on the bottom of the main or outer book section 23, and thus the chain is supported by the outer boom section so that as the vehicle travels down the road, the chain is supported to eliminate damage and prevent undue wear to the chain. As described previously, the self-supporting track 96 can be readily removed from the junction box 107 to permit the telescoping boom section 24 to be readily removed from the outer boom section 23 merely by removing the roller assembly 136 at the outer end of the outer boom section 23.

From the arrangement shown and described, it can be seen that the motive means in the form of the electric motor 37 and the speed reducing gear train which is required is carried by and moves with the telescoping boom section 23. With such an arrangement, it has been found that relatively small amounts of horsepower, i.e., ¼ to ⅓ of a horsepower, are required for extending and retracting the boom structure. The inner or telescoping boom section 23 is caused to move relative to the outer boom section by a sprocket 56 travelling on a relatively stationary chain 57 affixed to the outer boom section 23. The framework 36 with the gears mounted therein in effect serves as a gear box which also serves as a supporting framework for the supporting rollers which permit the telescoping section 24 to be readily extended and retracted with respect to the outer section 23.

As explained previously, the inner or telescoping boom section is constructed in such a manner that either an insulated or a metallic boom can be provided for the telescoping section 24. The use of the round or tubular member 122 makes it possible to utilize the best materials while still keeping the cost of the member 122 relatively low. This is made possible by the cantilever construction for supporting the inner boom section 24 on the outer boom section 23. All of the high stress rollers are mounted on the rear end of the telescoping boom section 24 so that, in effect, the forward portion of the telescoping boom section is cantilevered from the rear portion of the boom section 23 and the outer end of the member 122 is able to move free in directions at right angles to the longitudinal axis of the member 122. As will be noted from FIGURE 2B, the cantilevered tubular member 122 is mounted so that it is normally in the uppermost part of the portion of the outer boom section 23 and out of engagement with the lowermost roller 139. Thus, when a load is placed in the workman's basket 28, this load will cause the tubular member 122 to be deformed downwardly away from the top roller 139 of the roller assembly 136. Only under undue loads would the tubular member 122 be sufficiently deformed downwardly to engage the lowermost roller 139. Thus, in normal operation, the tubular member 122 is out of engagement and does not make any substantial contact with the roller 139 and, therefore, the member 122 is solely supported by the rear portion of the telescoping boom 24. The bending moment which is applied to the telescoping boom section 24 is carried by the rollers 127 and by the large roller 131. The torsional forces which are applied to the boom structure are divided between the rollers 127 and the roller 131 to provide relatively good load distribution.

Another embodiment of the lifting equipment is shown in FIGURES 7–10 and is substantially identical to that hereinbefore described with the exception of the manner in which the inner and outer boom sections are driven with respect to each other. Thus, as shown in FIGURES 7–10 of the drawings, the boom structure is mounted for movement about a horizontal axis formed by the pivot shaft 151. The pivot shaft 151 is mounted on the rear lowermost extremity of the outer boom section 152. The boom structure 21 also includes an inner telescoping section 153. The outer boom section 152 is substantially rectangular in cross-section, whereas the inner boom section 153 is substantially circular. The outer boom section 152 is provided with reinforcing plates 156. The rear portion of the main or outer boom section 152 is connected to the actuator assembly 26 as shown particularly in FIGURE 7 which is utilized for raising and lowering the outer boom section about the pivot point formed by the pivot shaft 151. The inner boom section is provided with an extension 158 which extends rearwardly and which has a shaft 159 mounted thereon. A single roller 161 is mounted on one end of the shaft, whereas an arm 162 is pivotally mounted on the other end of the shaft and carries a pair of rollers 163. The rollers 161 and 163 are adapted to engage the upper inner surface of the outer or main boom section 152. Two rollers 163 are provided on one side and only one roller 161 on the other side of the inner boom section 153 because of the side loading provided on the inner boom section 153 by the workman's platform or basket 28.

Means is provided for supporting the lower side of the inner boom section 153 as it travels in the outer boom section 152 and consists of a saddle 156 secured to the inner boom section 153 which has rollers 167 mounted on the opposite sides and adapted to engage the bottom inner surface of the outer boom section. Side guiding rollers 168 are mounted adjacent the bottom of the saddle 166 and are adapted to engage the inner side wall surface of the outer boom section 152. With the foregoing construction as in the previous boom structure herein disclosed, there is provided means for supporting the rear extremity of the inner boom section 153 within the outer boom section so that it can travel therein and support the remainder of the inner boom section in cantilever fashion.

Means is provided for causing extension or retraction of the inner or telescoping boom section 153 with respect to the outer boom section 152 and consists of an extension motor 171 which has a base plate 172 secured by cap screws 173 to a gear box 174. The gear box 174 is secured to the side of the outer boom section 152 by cap screws 176. The extension motor 171 has an output shaft 177 which extends into the gear box 174 and has a pinion 178 mounted thereon. The pinion 178 drives a gear 179 rotatably mounted upon a shaft 181 in the gear box 174. A pinion 182 is also mounted on the shaft 181 and drives a gear 183 mounted on a shaft 184 rotatably mounted in the gear box 174 upon ball bearing assemblies 186. The shaft 184 extends into the interior of the main or outer boom section 152 and has a sprocket 188 mounted thereon and driven thereby. The sprocket 188 drives a chain 189. The chain 189 has one end affixed to the saddle 166 by a block 191 and has the other end also connected to the saddle 166 through a linkage 192 which includes a spring 193 which causes the chain 189 to be kept relatively taut. The chain drives a sprocket 196 mounted upon the inner boom section 153.

As hereinbefore explained, a workman's platform is provided on the outer end of the boom structure and control means is provided accessible to the workman on the workman's platform controlling the movement of the boom structure and also causing relative movement between the outer boom section 152 and the inner boom section 153. This includes the drive motor 171 which is controlled by the control means accessible from the workman's basket. This means includes self-supporting track means 201 of the type hereinbefore described which has one end connected to the rear extremity of the inner boom section 153 by connecting the same to the extension 158. The other end of the self-supporting track means is secured to the lower inner side of the outer boom section 152 as can be seen particularly in FIGURE 10. A pair of cables 202 and 203 are carried by the self-supporting track 201 in an identical manner to that hereinbefore described in conjunction with the previous embodiment. As can be seen from FIGURE 10, the cables 202 and 203 extend through the outer boom section and pass to the rear where they connect to the motor 171 to supply power to the motor 171 and to control operation of the motor 171.

A limit switch 206 is mounted upon a bracket 207 carried by the extension 158 and is provided for arresting the travel of the inner boom section when it has been retracted to a predetermined position.

Operation and use of the embodiment of the invention shown in FIGURES 7–10 is substantially identical to that hereinbefore described. The principal difference is that the extension drive means is mounted exterior of the boom in the present embodiment where it was mounted within the outer boom section and travelled with the inner boom section in the previous embodiments. Even though the drive motor 171 and the gear box 174 are mounted exterior of the boom structure, it can be seen that the extension drive means is relatively compact. As the motor 171 is operated, the sprocket 188 drives the chain which is affixed to the inner boom section 153 so that as the chain is driven, the inner boom section is extended and retracted with respect to the outer boom section 152. The cables which are utilized for controlling the motors 171 from the control means accessible from the workman's platform are carried by the self-supporting track means 201 and follow the inner boom section 152 as it is extended and retracted without endangering the cables.

It is apparent from the foregoing that there has been provided a new and improved lifting equipment which has a particularly unique telescoping boom structure which is relatively simple in construction and which is provided with unique extension and retraction means. The motive means for extending and retracting the boom can be mounted within the outer boom section and carried by the inner boom section or, alternatively, can be mounted externally on the outer boom section for driving the inner section. Self-supporting track means is provided for the control cables for controlling the motor 171 from the control means accessible from the workman's basket without endangering the cables. The boom structure is one in which an insulated section can be readily utilized. The construction is also such that it can be readily taken apart for maintenance and repair.

What is claimed is:

1. In a lifting equipment, a platform, a support structure mounted on the platform, a boom structure mounted on said support structure, said boom structure having an outer boom section mounted on said support structure and a telescoping boom section mounted for telescoping movement in and out of said outer section, and motive drive means mounted on said telescoping section and movable with said telescoping section and engaging said outer section for causing movement of said telescoping section with respect to said outer section.

2. A lifting equipment as in claim 1 wherein said motive drive means includes a framework forming a part of said telescoping boom section, a motor mounted in said framework, and a speed reducing assembly connected to said motor and mounted on said framework.

3. A lifting equipment as in claim 2 together with a drive chain secured to said outer section and wherein said motive drive means includes a sprocket driven by said speed reducing assembly and wherein said sprocket engages said chain whereby as said motor is operated, said sprocket travels on said chain to advance and retract said telescoping boom section with respect to said outer boom section.

4. A lifting equipment as in claim 1 together with self-supporting carrier track means having one end secured to said outer boom section and having the other end secured to said telescoping boom section and control cable means carried by said self-supporting carrier track means and connected to said motive means, said self-supporting carrier track means serving to control the positioning of said cables in said outer boom section as the telescoping boom section is extended and retracted.

5. A lifting equipment as in claim 4 wherein said one end of said self-supporting carrier track means is secured to the forward portion of the outer boom section and wherein the other end of said self-supporting carrier track means is secured to the rear portion of the telescoping boom section so that an upper run is formed which is positioned above the bottom of the outer boom section and follows the telescoping boom section.

6. A lifting equipment as in claim 1 wherein said telescoping boom section is provided with a substantially tubular elongate member which is substantially circular in cross-section and means for securing said tubular element to said framework so that said member forms a cantilever, and roller means carried by the rear portion of said telescoping section and permitting relative movement between the outer section and the inner section and permitting free movement of the outer end of the member in directions at right angles to the longitudinal axis of said member.

7. A lifting equipment as in claim 4 together with a workman's basket or platform carried by the outer end of the telescoping section and a control mechanism disposed in a position convenient to the operator in said workman's platform or basket, and a control cable carried by said self-supporting carrier track means and connected to said control mechanism.

8. A lifting equipment as in claim 6 together with a removable roller assembly mounted on the front portion of the outer boom section and engageable by said member of said telescoping boom section.

9. In a lifting equipment, a platform, a support structure mounted on the platform, means rotatably mounting the support structure upon the platform for rotation about a substantially vertical axis, a boom structure having an outer boom section and an inner boom section, means pivotally mounting the outer boom section on the support structure for pivotal movement about a substantially horizontal axis, a workman's platform carried by the outer end of the telescoping boom section and control means disposed within reach of the operator in the workman's basket, said inner boom section including a framework, and motive drive means mounted in said framework and movable with said inner boom section and engaging said outer boom section for causing extension and retraction of said inner boom section with respect to said outer boom section.

10. A lifting equipment as in claim 9 wherein said motive drive means includes a motor, a speed reducing gearing connected to said motor and a sprocket driven by said speed reducing gearing together with a chain secured to said outer boom section and engaged by said sprocket.

11. A lifting equipment as in claim 9 wherein said inner boom section includes an elongate member mounted on said framework as a cantilever and wherein said member carries said workman's basket.

12. A lifting equipment as in claim 9 together with self-supporting carrier track means having one end secured to said outer boom section and having the other end secured to said inner boom section, and cables carried by said track means connected to said motive means and to said control means.

13. In a lifting equipment, a platform, a support structure mounted on the platform, a boom structure mounted on the support structure, said boom structure having an outer boom section and a telescoping boom section, a workman's platform carried by the telescoping section, and motive means for causing telescoping movement of said telescoping boom section relative to said outer section, said telescoping section including a rear portion and a front portion, said front portion being mounted on said rear portion as a cantilever whereby the outer extremity of the front portion is free to move in directions at right angles to the longitudinal axis of the front portion, said rear portion providing the sole support for said telescoping boom section.

14. In a lifting equipment, a platform, a support structure mounted upon the platform for rotation about a substantially vertical axis, a boom structure having an outer boom section and an inner boom section, means pivotally mounting the outer boom section on the support structure for pivotal movement about a substantially horizontal axis, a workman's platform carried by the outer end of the telescoping boom section, control means disposed within reach of the operator in the workman's basket, and motive drive means for causing relative movement between said inner boom section and said outer boom section, said drive means including self-supporting track means having one end connected to the inner boom section and having the other end connected to the outer boom section, said self-supporting track means having at least one cable therein, said cable serving to connect said control means to said motive drive means.

15. A lifting equipment as in claim 14 wherein said motive drive means is mounted on the inner boom section and moves with the inner boom section.

16. A lifting equipment as in claim 14 wherein said motive drive means includes a motor mounted exterior of the outer boom section, a chain mounted within the outer boom section and secured to said inner boom section, a gear box mounted on said outer boom section and having an output shaft, a sprocket carried by said output shaft and engaging said chain, and an additional sprocket engaged by said chain and mounted on said inner boom section.

17. A lifting equipment as in claim 14 wherein said self-supporting track means is disposed completely within said outer boom section and wherein said inner boom section is adapted to travel over at least a portion of said self-supporting track means as the inner boom section is retracted.

18. A lifting equipment as in claim 14 wherein said motive drive means includes a motor speed reducing gearing connected to said motor and a sprocket driven by said speed reducing gearing and a chain engaged by said sprocket, said sprocket driven by said speed reducing gearing being mounted on one of said sections and said chain being secured to the other of said sections.

References Cited
UNITED STATES PATENTS

| | | | |
|---|---|---|---|
| 3,136,385 | 6/1964 | Eitel | 182—2 |
| 3,243,123 | 3/1966 | Ingraham | 182—2 |
| 3,301,346 | 1/1967 | Verrell | 182—2 |

REINALDO P. MACHADO, Primary Examiner

U.S. Cl. X.R.

182—2; 212—144